A. GODFREY.
CUTTING TORCH.
APPLICATION FILED JAN. 26, 1921.

1,420,921.

Patented June 27, 1922.
7 SHEETS—SHEET 2.

Inventor
Alfred Godfrey
by
Hubert A. Gill
Attorney

A. GODFREY.
CUTTING TORCH.
APPLICATION FILED JAN. 26, 1921.

1,420,921.

Patented June 27, 1922.
7 SHEETS—SHEET 4.

A. GODFREY.
CUTTING TORCH.
APPLICATION FILED JAN. 26, 1921.

1,420,921.

Patented June 27, 1922.
7 SHEETS—SHEET 5.

A. GODFREY.
CUTTING TORCH.
APPLICATION FILED JAN. 26, 1921.

1,420,921. Patented June 27, 1922.
7 SHEETS—SHEET 6.

Inventor
Alfred Godfrey
by
Hubert A. Gill
Attorney.

UNITED STATES PATENT OFFICE.

ALFRED GODFREY, OF LONDON, ENGLAND.

CUTTING TORCH.

1,420,921.  Specification of Letters Patent.  Patented June 27, 1922.

Application filed January 26, 1921. Serial No. 440,137.

*To all whom it may concern:*

Be it known that I, ALFRED GODFREY, a subject of the King of Great Britain, and residing at Boundary Road, Wood Green, London, N. 22, England, have invented certain new and useful Improvements in Cutting Torches, of which the following is a specification.

This invention relates to cutting torches. In cutting operations with an oxy-acetylene or the like flame, when a particular operation is finished, or if cutting has to be otherwise stopped, the gases have to be cut off and the heating flame extinguished. Before the cutting operation can be resumed the oxygen and acetylene valve cocks have to be reset in order to obtain the correct mixture for an efficient heating flame. This adjustment is of a very fine character and requires great accuracy in setting before it can be made, so that at the beginning of each cutting operation considerable time may be occupied in setting and resetting the gas valves and lighting and re-lighting the gas jet. It is the object of the present invention to provide means whereby on raising the cutter head away from the work-piece the gases are cut off without interfering with the adjustment of the mixture for the heating flame, while on lowering the cutter head to the cutting position the gases are turned on, either mechanically or by hand, at the correct proportions for an efficient heating flame. A further object of the invention is to provide means whereby, after the fine adjustments on the heating gas valves have been effected, the valves may be closed if required and opened subsequently to the same positions without any fine adjustment. A further object of the invention is to provide means whereby as the burner nozzle is brought into the cutting position the combustible mixture for the heating flame is ignited automatically by means of an electric spark. A still further object is to provide means whereby the actual path to be followed by the cutting flame can be traced out beforehand, and the amount of irregularity in the work-piece can be automatically indicated. These and other objects are attained by a torch constructed according to the present invention, and as illustrated by way of example in the accompanying drawings, wherein:—

Figures 15 to 17 illustrate a modification of the cutting torch, Figures 15 and 16 being a side elevation and plan respectively, while Figure 17 is an end view.

Figure 1:
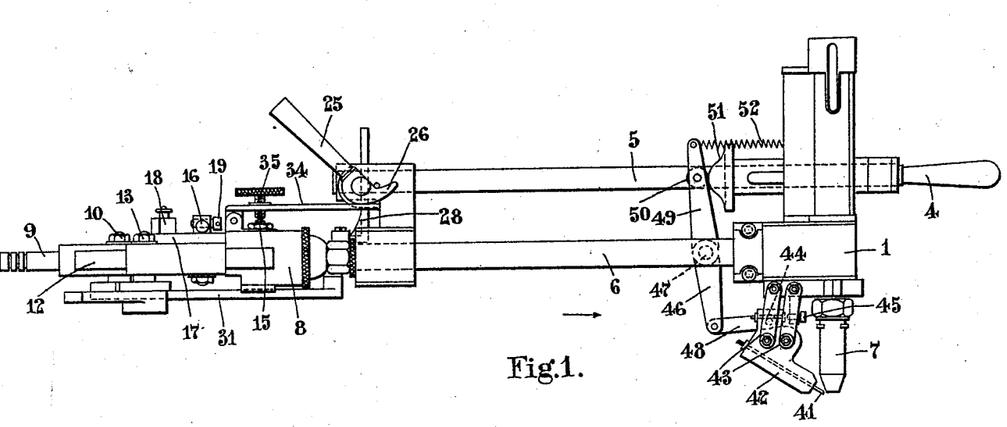
Figure 1 is a view in elevation of one form of cutting torch according to the present invention.
Figure 2:
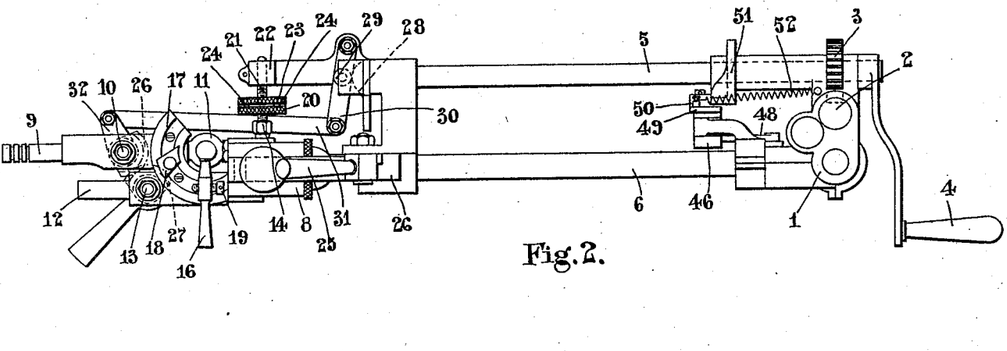
Figure 2 is a plan view of Figure 1.
Figure 3:
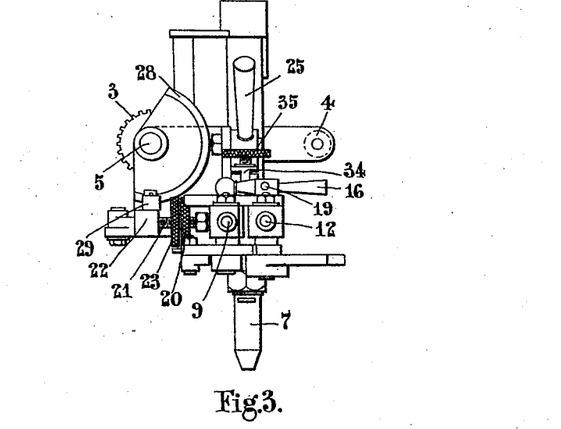
Figure 3 is an end view of Figure 1 looking at the control valve end of the torch.

Referring now to Figures 1 to 3 of the drawings, the numeral 1 indicates the cutter head which is of the same general type as that set forth in my U. S. Patent No. 1,357,859. The cutter head 1 is mounted so as to be capable of being raised and lowered by means of a rack 2 and pinion 3, which latter is turned by means of the handle 4 mounted on the shaft 5 which carries said pinion 3. A pipe 6 connects the cutter head with the valve portion of the torch, said pipe serving to convey the heating and cutting gases to the burner nozzle 7.

The valve portion of the torch comprises a gas mixing chamber 8 wherein the heating oxygen and acetylene are mixed. This chamber also contains a separate valve controlled passage for the cutting oxygen which is led by a separate conduit to the burner nozzle 7. The acetylene is led to the chamber 8 through the pipe 9, valve 10 and adjusting valve 11. The oxygen is led to the said chamber through the pipe 12 and valve 13, after which it is divided into two streams, one flowing through the heating oxygen adjusting valve 14 into the mixing chamber where it is mixed with the acetylene, and the other flowing through the cutting oxygen valve 15, whence it flows through a separate conduit to the burner nozzle 7.

The acetylene adjusting valve comprises an ordinary cock the handle 16 of which works over a grooved segment 17, in which groove an adjustable stop 18 is provided. The handle 16 is provided with a set screw 19 the point of which is adapted to abut against the stop 18. When the valve is to be adjusted the handle 16 is turned to the approximate position required, the stop 18 is then slid up against the end of the set screw 19 and clamped in position, final adjustment being effected by means of the set screw 19.

The oxygen heating valve 14 is in the form of a needle which is operated by means of a relatively large knurled head 20. In axial alignment with the needle valve 14 and above the knurled head 20 a set screw 21 of the same pitch as the thread on the needle valve stem is provided, said set screw screwing into a suitable bracket 22 by means of a knurled head 23 of preferably the same size as that of the needle valve 14. Abutments 24 are provided on each of the adjacent faces of the knurled heads 20 and 23, said abutments being of a depth equal to or slightly less than the pitch of the thread of the valve spindle 14. When the valve 14 is adjusted to its correct position the upper knurled head 23 is turned and lowered until its abutment comes up against that of the head 20. The portion of the bracket 22 adjacent the set screw 21 is split and a locking screw is provided to draw the split portions together to ensure locking of the set screw 21 after it has been adjusted. Alternatively, a locknut may be provided on the set screw 21. The abutments 24 being of the particular depth mentioned permit of engagement during one turn only of either of the knurled heads 20 and 23.

The cutting oxygen is controlled by means of a spring valve 15 of well known type for this purpose. This valve is actuated by means of a lever arm 25 having a snail cam 26 arranged thereon and adapted to press down the arm 34 on which is mounted the adjusting screw 35 which abuts against the valve stem of the valve 15 against the action of its spring, so that when the said arm 25 is operated the valve 15 is raised from or lowered on its seating. With this arrangement the cutting oxygen valve can be instantly opened and held open without any further manipulation.

The valves 10 and 13, which are actuated between the gas supply and the adjusting valves 11 and 14 and cutting oxygen valve 15, comprise two cut-off valves of known type. Toothed segments 26 and 27 are provided on extensions of the valves 10 and 13 respectively, and these segments are adapted to mesh with one another, so that when one valve is operated the other is also operated.

The operation of these valves 10 and 13 is effected by means of a cam 28 mounted on the shaft 5. The said cam 28 engages with a roller 29 revolubly mounted on a lever 30 which in its turn is pivotally mounted on the bracket 22. A link 31 connects the free end of lever 30 with a lever 32 rigidly mounted on the valve stem of the valve 10. The cam 28 is of such a form that as the handle 4 is turned to bring the burner nozzle 7 into the cutting position the valves 10 and 13 will be opened, while when the handle 4 is turned to take the burner nozzle 7 out of the cutting position the said valves will be closed. A hand lever 33 is rigidly mounted on the stem of the valve 13 for operating the valves 10 and 13 by hand if required. With the above arrangement one valve, for example the acetylene valve, 10, may be set to open a little earlier than the other valve by changing the position of the gear segment on the valve spindle.

In order to effect ignition of the combustible mixture two sparking points 40 and 41 are mounted on a swinging member 42 which itself is mounted on the cutter head 1 adjacent the burner by means of swing links 43, whereby the sparking points may be swung into close proximity to the gas jet issuing from the burner nozzle 7. The sparking point 41 is connected to a suitably insulated contact 44 on the swing member 42, which contact is adapted to make connection with an adjustable earth contact 45 mounted on the cutter head 1 when the two sparking points are in the position for igniting the combustible jet. The other sparking point 40 is connected to the positive terminal of a trembler coil (not shown) which has current supplied thereto from an accumulator or the like. A lever 46 fulcrumed at 47 on the cutter head is connected at its free end by means of a link 48 to the swing member 42. A second lever 49 rigidly connected with the lever 46 at its fulcrum has a roller 50 mounted thereon to engage with a cam 51 mounted on the pinion shaft 5 of the cutter head 1, while a spring 52 is interposed between the free end of the lever 49 and the cutter head 1 in order to keep the lever roller pressed up against the cam 51.

Figure 4:
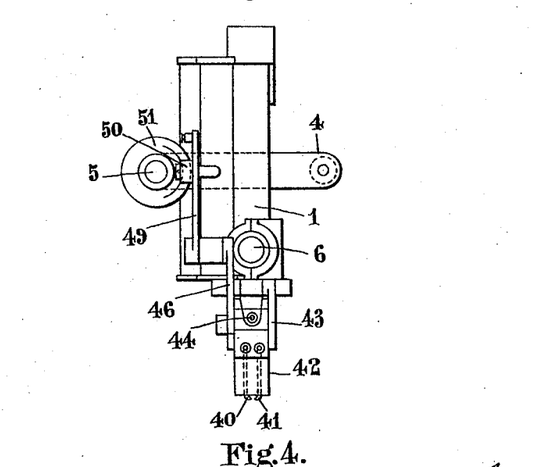
Figure 4 is an end view of the cutter head and of Figure 1 looking in the direction of the arrow.

The shape of this cam is such that as the cutter head is lowered the lever 46, 49, is caused to swing so that its lower end brings the swing member 42 carrying the sparking points 40 and 41 into close proximity to the burner nozzle 7; simultaneously contact is made between the contact 46 on the swing member and the earth contact 45, with the result that a spark occurs between the sparking points and the combustible jet is ignited. Further downward movement of the cutter head causes the lever 46, 49 to swing back to its normal position, thus cutting off the current and moving the sparking points out of range of the combustible jet.

A combined effect of the cam 51 with the spring 52 actuating the lever 46, 49, is to bring the cutter head 1 into its upper and lower positions and to keep it pressed into these positions.

Figures 5 to 8 show a modified form of cutting torch according to the present invention. In this construction the pinion shaft 5 terminates with the cam 51, the control valves 10 and 13 being operated by means of the link member 60 which is actuated by the lever 46, 49, as it moves under the influence of the cam 51. In the construction shown the link member 60 is connected to a lever 61 rigidly mounted on the valve 13, said connection being by means of a slotted end 62 which engages a projection on the lever 61. A spring-influenced pin 55 is mounted at the slotted end 62 of the rod 60, and is adapted to project into the slot so as to engage the projection on the lever 61. A bayonet socket device is provided on the pin 55 so that it may be withdrawn from the slot and maintained in this position. The pin 55 is allowed to project into the slot only after the heating mixture has been ignited, so that when the handle 4 is operated to lift the cutter head the valves 10 and 13 will be turned off. A handle 67 is provided on the valve 10 for operating the valves 10 and 13 by hand.

Further modifications contained in this construction consist in the acetylene gas-adjusting valve 63 which is of similar construction to that of the heating oxygen valve, as will be seen from the drawings without further description. The arm 34 of the cutting oxygen valve 15 is adapted to be pressed down by hand and is maintained in position by means of the pawl 64. The pawl 64 is adapted to be pressed back by means of a spring-influenced lever 65 whose lower end is maintained in contact with an abutment 66 rigidly mounted on the link member 60. As the cam 51 actuates the lever 46, 49 on the upward movement of the cutter head, the abutment 66 presses against the lever 65 which in its turn presses against the pawl 64 and so releases the arm 34, allowing the valve 15 to close under the influence of its spring. In the above construction the heating gases are conveyed from the valve end of the torch by means of separate pipes 68 and 69 for the oxygen and acetylene respectively, to the burner nozzle 7 above which a mixing chamber 70 is provided and in which the heating gases are mixed. The cutting oxygen is conveyed by means of a pipe 71 to the burner nozzle 7.

The electric ignition device comprises the swinging block 42 made of insulating material and links 43 and 48, but one sparking point only is provided. The said sparking point 72 is connected to a bent-up contactor member 73 which is adapted to make contact with a terminal 74 on the block 42 being moved into the sparking position. The terminal 74 is connected by a load 75 to the positive terminal of an induction coil not shown. A second contact member 76 is provided in the swinging block 42. This member 76 is adapted to press up against a pin 77 and an insulated terminal 78 mounted on the cutter head in close proximity to the pin 77 so that a connection may be made between said pin and terminal when the block 42 is swung into the sparking position. The terminal 78 is connected by means of the lead 79 to the negative side of the above coil. With this arrangement, the burner nozzle forms part of the return circuit only when sparking is to occur, being isolated at other times, so that the spark occurs between the ignition point 72 and the burner nozzle 7. The leads 74 and 79 are led to the induction coil through a suitable conduit 80.

Figures 5, 6, 8:
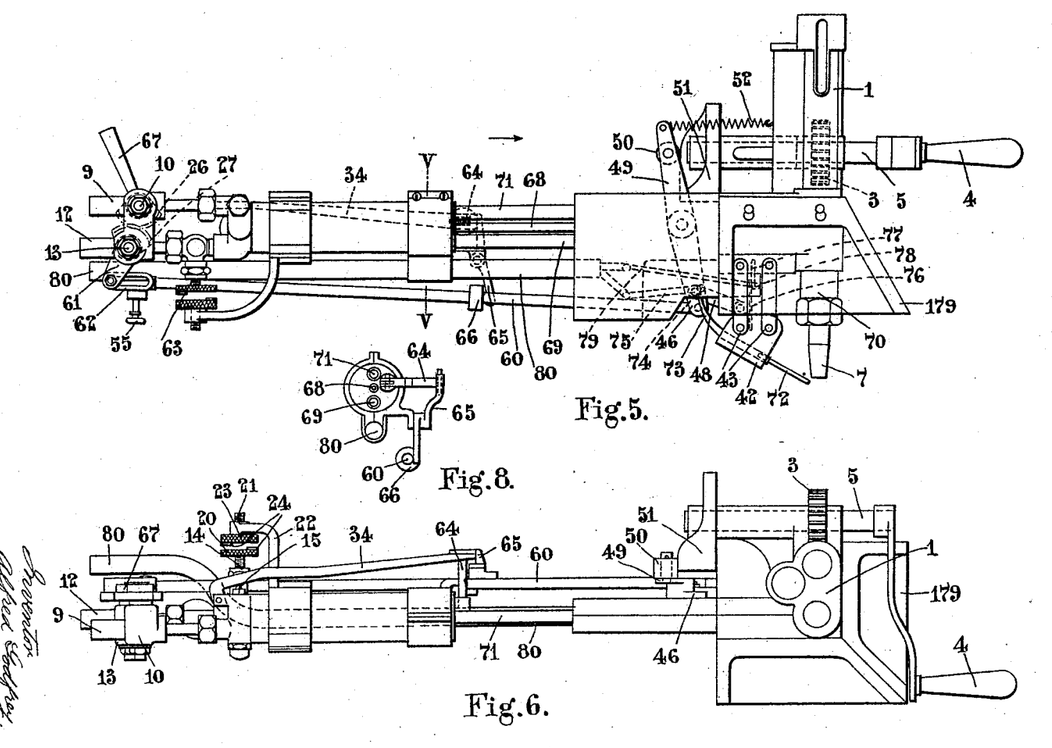
Figure 5 is a view in elevation of another form of cutting torch according to the present invention.
Figure 6 is a plan view of Figure 5.
Figure 8 is a sectional view taken on the line V—V of Figure 5.
Figure 7:
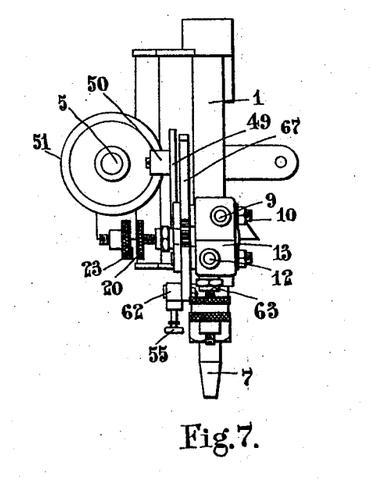
Figure 7 is an end view of Figure 5 looking in the direction of the arrow.

The cutting torch is shown with an anti-glare screen 179 affixed thereto.

Figure 9:
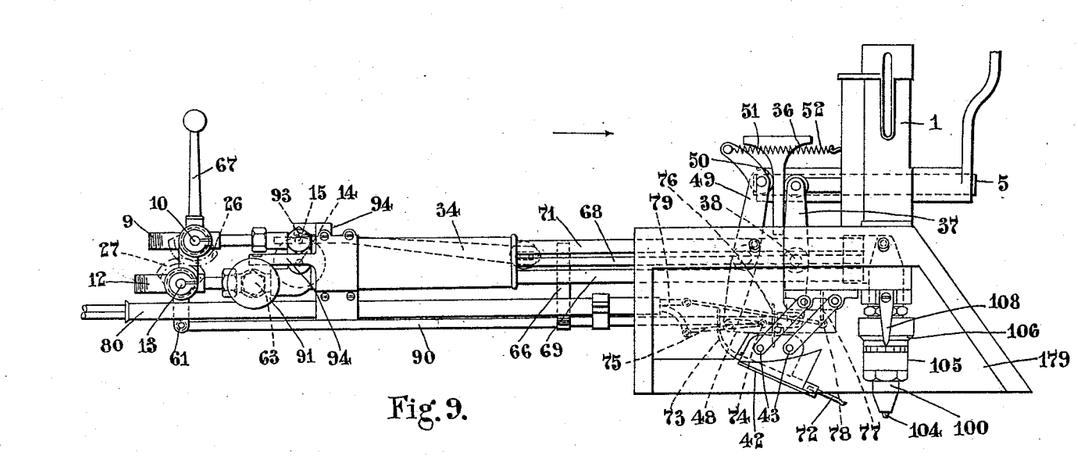
Figure 9 is a view in elevation of a further form of cutting torch according to the present invention.
Figure 10:
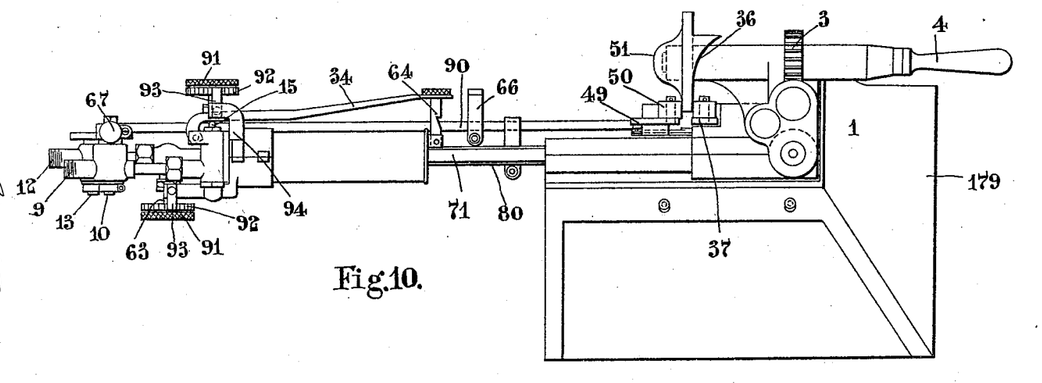
Figure 10 is a plan view of Figure 9.
Figure 11:
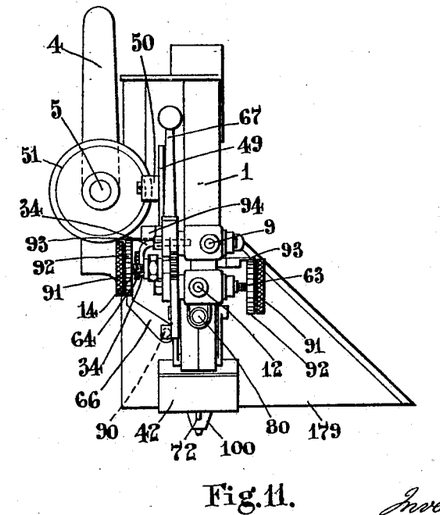
Figure 11 is an end view of Figure 9 looking in the direction of the arrow.

Figures 9 to 11 show a preferred form of construction of blow pipe according to the present invention and is somewhat similar to the construction shown in Figures 5 to 8. In this form the valves 10 and 13 may be operated by the hand lever 67. The cutting oxygen valve 15 is operated by hand, being held down by means of the pawl 64. The release of this pawl is effected by means of an abutment 66 mounted on the link member 90 as this latter moves towards the position for closing the control valves 10 and 13. The mechanical operation of the control valves is effected by means of a second cam face 36 on the pinion shaft 5, said cam face acting on a spring-influenced lever 37 which is fulcrumed at 38 and whose lower end is connected by means of the link member 90 to the lever 61 of the valve 13.

The heating oxygen and acetylene valves 14 and 63 respectively comprise needle valves operated by knurled heads 91 which have plain surfaces 92 provided for division marks which are read against a pointer 93 mounted on the brackets 94 so as to bear against the said divided surfaces. With this construction, both valves 14 and 63 can be very finely adjusted, after which they are left alone, all control being effected by means of the valves 10 and 13.

The ignition device is the same as that shown in Figures 5 to 8. In all the ignition devices above set forth the sparking is preferably arranged to occur just in advance of the turning on of the heating gases, a dwell on the actuating cam serving to maintain the spark long enough to ensure ignition.

As in the torch shown in Figures 5 to 8, the mixing of the gases takes place inside the burner nozzle 100. This burner nozzle is of special construction and is shown in section in Figure 12. It comprises a central stem 101 having a central hole 102 bored through it for the passage of the cutting oxygen. The upper end of the stem 101 has a seating formed thereon which is adapted to make a gas tight joint with a corresponding seating at the end of the cutting oxygen passage 120 and the heating mixture passages 121 in the cutter head. The outside of the stem 101 has a number of spiral grooves formed thereon the upper ends of which communicate with the heating mixture passage. The said spiral grooves have the effect of imparting a whirling motion to the heating mixture and serve more effectively to mix the gases and at the same time to prevent the formation of spread jets at the nozzle orifice.

Figure 12:
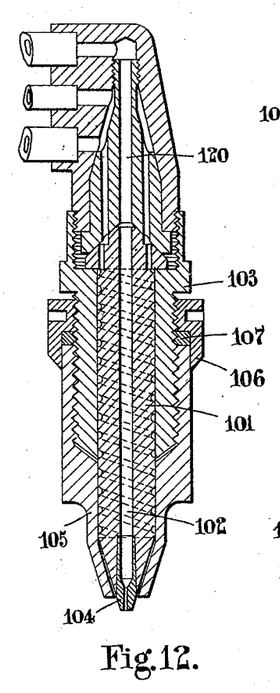
Figure 12 is a detail view of one form of burner nozzle according to the present invention.

The lower end of the stem 101 is coned and it is tipped with a nipple 104 of heat resisting material such as tungsten. Over the stem 101 a sleeve 105 is provided, said sleeve being made a good fit over the stem. The lower end of the sleeve 105 is coned to correspond with the end of the stem 101, while the upper portion of the said sleeve is increased in diameter and is threaded to engage with a corresponding screw thread on the socket 103. By raising or lowering the sleeve 105 the annular orifice formed between it and the nipple 104 may be varied so that the volume of heating gases may be varied to suit the thickness and nature of the metal to be cut. To insure against leakage of gas with such an arrangement a gland nut 106 is provided on the stem 101 and packing 107 is provided between the socket 103 and gland nut 106. In order to provide for fine adjustment and also to provide for some kind of standard adjustment of the sleeve 105, a pointer 108 is provided on the cutter head and divisions are marked on the outside of the sleeve 105 for reading against said pointer 108. The finenss of adjustment indicated by said divisions will depend on the fineness of the screw thread by which the sleeve 105 and socket 103 engage one another, and on the angle of the conical surfaces.

Figure 13:
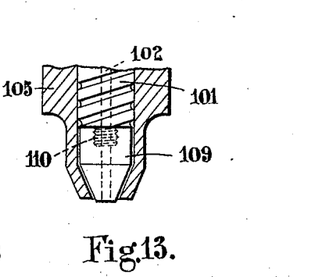
Figures 13 and 14 are detail views of modified forms of burner nozzles.
Figure 14:
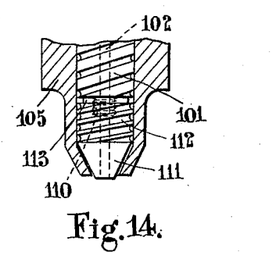

In a preferred form of nozzle of the kind above described the spiral grooves do not reach quite to the bottom of the parallel portion of the stem 101. Such a nozzle is shown in Figure 13. In this construction the stem 101 is made in two parts, the main portion with the spiral grooves and the conical portion 109. This latter has a parallel portion of slightly less diameter than the main portion of the stem, and fits on to the said stem by means of a screwed projection 110. With this construction different sizes of conical portions may be used for different thicknesses of metal to be cut. This form of nozzle is more applicable for cutting thick metal where a long flame is required. When it is desired to cut to great accuracy when cutting with a template for example the plain tip is replaced by a tip 111 having spiral grooves 112 of finer pitch than that of the grooves on the main portion of the stem, as shown in Figure 14. The tip 111 is preferably also made so as to leave an annular chamber at 113 between the end of the stem 101 and the commencement of the finer grooves at 112 in the tip 111, so that the gases may be interrupted in their flow and the mixing thereof is thereby improved before the gases complete their path of flow over the tip 111.

The projecting of the inner tube for the cutting oxygen assists in obviating the stopping up of the nozzle orifice with oxide, while the internal coning of the outer member of the nozzle serves to concentrate further the combustible gases around the cutting jet. This construction also allows of the oxygen cutting jet being brought closer to the work than has been possible hitherto, so that finer cuts may be effected without melting the edges of the cut.

Figure 15:
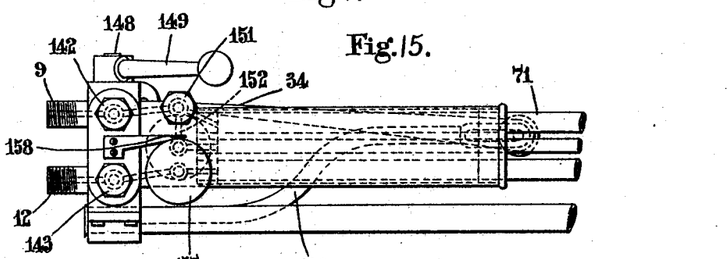
Figure 16:
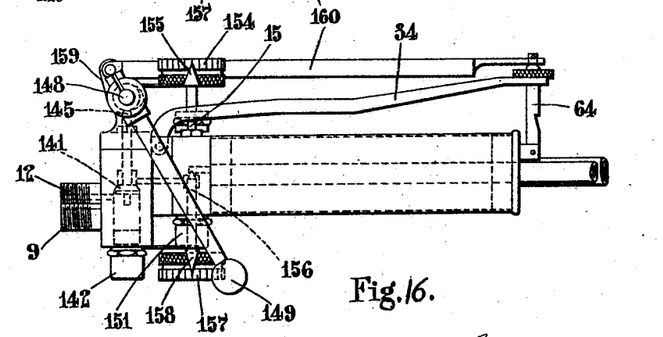
Figure 17:
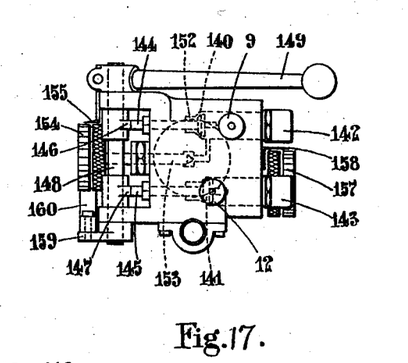

Figures 15 to 17 show another form of the cutting torch according to the invention, wherein poppet valves are used in place of the turning valves or cocks 10 and 13 of Figures 1 to 4 and Figures 5 to 8. The oxygen and acetylene are introduced as before through pipes 9 and 12 respectively leading into the chambers of poppet valves 140, 141. These valves are normally kept upon their seats by springs enclosed by caps 142, 143. The stems 144, 145 of the two valves project through the valve body 150, and are pressed back to open the valves by means of cams 146, 147, on a spindle 148 which is turned by means of a handle 149. This handle corresponds in its operation to the handle 67 of Figures 5 to 8. The valve 15 which controls the oxygen for cutting is the same as in Figures 5 to 8 and is normally held closed by a spring enclosed by the cap 151. The oxygen from valve 140 passes into the chamber of valve 15 and downwardly through a passage 152 into the chamber of a valve 153, whence it passes into the heating oxygen pipe 68 leading to the nozzle. The valve 153 is adjusted by a head 154 which is graduated, and turns under a pointer 155 which indicates the degree of opening of the valve 153. The acetylene after passing the valve 141 flows to the chamber of a valve 156 controlled by a graduated head 157 turning under a pointer 158. The adjustment of the mixture for heating purposes is therefore controlled by the settings of the graduated heads 154 and 157 which correspond with the head 20 of the oxygen valve, and the head of the acetylene valve 63 shown in Figures 5 to 8. The oxygen for cutting purposes is controlled by means of lever 34 depressing valve stem 15, and allowing oxygen to pass into the pipe 71.

The handle 149 is shown in the closed position of the valves 140, 141 in Figures 15 and 16, while the valves are shown as being held open by the cams 146, 147, in Figure 17. The stem 148 of the handle 149 has a lever 159 at its lower end to which a rod 160 is pivotally connected. The rod 160 has its further end slotted to engage over the end of the pawl 64 with which the end of lever 34 can engage when pressed inward to open valve 15 for allowing the cutting oxygen to pass through pipe 71. In Figure 16, the rod 160 is holding back the pawl 64 so that lever 34 cannot engage with the notch of the pawl. When handle 149 is turned toward the left in Figures 15 and 16, opening the valves 140, 141, the pawl 64 is released, so that it will engage the lever 34 when pressed inward. Then the cutting off of the gases by turning back the handle 149 to the position of Figures 15 and 16 causes pawl 64 to be pulled back, and the lever 34 to be released automatically, so that the cutting oxygen valve 15 is closed again.

The invention is not restricted to the particular type of cutting torches above described, but it may be applied to hand torches in which case the control valves and ignition device are operated by hand, preferably in conjunction with one another. Again the cutter head need not be arranged to be raised and lowered but may be fixed with regard to any vertical movement, the same cam mechanism as above described being employed for actuating the control valves and ignition device.

Having thus described my invention what I claim as new and desire to secure by Letters Patent is:—

1. A cutting torch comprising a burner nozzle, a gas mixing chamber with means for connecting it to the burner nozzle, pipes for conducting gases to the mixing chamber to produce a heating gas mixture, another pipe communicating with the burner nozzle for conducting the cutting gas to the said nozzle, means for adjusting the area of the passages through the pipes leading to the mixing chamber for the purpose of adjusting the quality of the gas mixture for the heating flame, a plurality of valves for cutting off and turning on the gases at will, mechanism for raising and lowering the burner nozzle, a shaft for operating said mechanism, a cam on said shaft, and link mechanism between the cam and the valves, said cam being so arranged that when the burner nozzle is raised the valves are closed and when the burner nozzle is lowered the valves are opened simultaneously.

2. A cutting torch comprising a burner nozzle, a gas mixing chamber with means for connecting it to the burner nozzle, pipes for conducting gases to the mixing chamber to produce a heating gas mixture, another pipe communicating with the burner nozzle for conducting the cutting gas to the said nozzle, means for adjusting the area of the passages through the pipes leading to the mixing chamber for the purpose of adjusting the quality of the gas mixture for the heating flame, a plurality of valves for cutting off and turning on the gases, means for operating said valves simultaneously, link mechanism connected to said valve-operating means, a spring normally holding the link mechanism in a position in which the valves are closed, means for raising and lowering the burner nozzle and a cam co-operating with said link mechanism, said cam being adapted to effect the opening of the valves when the burner nozzle is lowered and to allow the valves to close when the burner nozzle is raised.

3. A cutting torch comprising a burner nozzle, a gas mixing chamber with means for connecting it to the burner nozzle, pipes for conducting gases to the mixing chamber to produce a heating gas mixture, another pipe communicating with the burner nozzle for conducting the cutting gas to the said nozzle, a plurality of valves in each of said pipes leading to the mixing chamber, means for setting one of said valves in each pipe to any required position, whilst two other valves one in each pipe serve to cut the gases on and off, a handle, and means operated by the turning of said handle whereby both of said latter valves are opened on the turning of said handle in one direction and are closed on the turning of said handle in the opposite direction, a valve for controlling the cutting gas, means for operating said valve by hand, and means for connecting the mechanism for cutting the heating gases on and off, said means being such that when the mechanism cuts off the gases forming the heating mixture, the cutting gas valve is allowed to close automatically.

4. A cutting torch comprising a burner nozzle, a gas mixing chamber with means for connecting it to the burner nozzle, pipes for conducting gases to the mixing chamber to produce a heating gas mixture, another pipe communicating with the burner nozzle for conducting the cutting gas to the said nozzle, means for adjusting the area of the passages through the pipes leading to the mixing chamber for the purpose of adjusting the quality of the gas mixture for the heating flame, and means for effecting the cutting off and turning on of the heating gases by hand or mechanically at will.

5. A cutting torch comprising a burner nozzle, a gas mixing chamber with means for connecting it to the burner nozzle, pipes for conducting gases to the mixing chamber to produce a heating gas mixture, another pipe communicating with the burner nozzle for conducting the cutting gas to the said nozzle, means for adjusting the area of the passages through the pipes leading to the mixing chamber for the purpose of adjusting the quality of the gas mixture for the heating flame, separate means for cutting off and turning on the gases at will without interfering with the adjustment of the passage area, a support attached to said burner nozzle, terminals in said support, and an electric ignition device, said ignition device comprising a swinging block, sparking means on said block, and means for swinging the block towards and away from said burner nozzle, and to bring the sparking means into and out of contact with the terminals.

6. A cutting torch comprising a burner nozzle, a gas mixing chamber with means for connecting it to the burner nozzle, pipes for conducting gases to the mixing chamber to produce a heating gas mixture, another pipe communicating with the burner nozzle for conducting the cutting gas to the said nozzle, means for adjusting the area of the passages through the pipes leading to the mixing chamber for the purpose of adjusting the quality of the gas mixture for the heating flame, separate means for cutting off and turning on the gases at will without interfering with the adjustment of the passage area, a support attached to said burner nozzle, terminals on said support, a contact on the support connected to one of the terminals and an electric ignition device, said ignition device comprising a swinging block, a sparking point on said block, a terminal member to which the sparking point is connected, said terminal being adapted to abut against the contact when the swinging block is in the sparking position, and means for swinging the block into and out of the sparking position.

7. A cutting torch comprising a burner nozzle, a gas mixing chamber with means for connecting it to the burner nozzle, pipes for conducting gases to the mixing chamber to produce a heating gas mixture, another pipe communicating with the burner nozzle for conducting the cutting gas to the said nozzle, means for adjusting the area of the passages through the pipes leading to the mixing chamber for the purpose of adjusting the quality of the gas mixture for the heating frame, separate means for cutting off and turning on the gases at will without interfering with the adjustment of the passage area, means for raising and lowering the burner nozzle, a support attached to said burner nozzle, terminals on said support, a contact on the support connected to one of the terminals, and an electric ignition device, said ignition device comprising a swinging block, a sparking point on said block, a terminal member to which the sparking point is connected, said terminal being adapted to abut against the contact when the swinging block is in the sparking position, and means for swinging the block into and out of the sparking position, said means being controlled by the means for raising and lowering the burner nozzle.

8. A cutting torch comprising a burner nozzle, a gas mixing chamber with means for connecting it to the burner nozzle, pipes for conducting gases to the mixing chamber to produce a heating gas mixture, another pipe communicating with the burner nozzle for conducting the cutting gas to the said nozzle, means for adjusting the area of the passages through the pipes leading to the mixing chamber for the purpose of adjusting the quality of the gas mixture for the heating flame, means for raising and lowering the burner nozzle, a cam rotated by said raising and lowering means, valves for cutting off and turning on the heating gases, mechanism connected to the said valves, said mechanism being operated by the cam, a swinging block with a sparking point, and means connecting the swinging block to the cam, said cam being so arranged that when the burner nozzle is lowered the valves are opened and the sparking point brought near the burner nozzle to ignite the gases and then removed therefrom, and when the burner nozzle is raised the valves are closed.

9. A cutting torch comprising a burner nozzle, a gas mixing chamber with means for connecting it to the burner nozzle, pipes for conducting gases to the mixing chamber to produce a heating gas mixture, another pipe communicating with the burner nozzle for conducting the cutting gas to the said nozzle, means for adjusting the area of the passages through the pipes leading to the mixing chamber for the purpose of adjusting the quality of the gas mixture for the heating flame, means for raising and lowering the burner nozzle, a cam rotated by said raising and lowering means, valves for cutting off and turning on the heating gases, a swinging block with a sparking point and link mechanism operated by the cam and connected to the valves and swinging block, the said cam being adapted to control the opening and closing of the valves and the movement of the swinging block, towards and away from the burner nozzle.

10. A cutting torch comprising a burner nozzle, said burner nozzle including a sleeve with a conical end, and a centrally bored stem having spiral passages formed around the outer surface thereof, said stem having a conical end corresponding to the conical end of the said sleeve, a gas mixing chamber with means connecting it to the spiral passages around the said stem, pipes for conducting gases to the mixing chamber to produce a heating gas mixture, another pipe communicating with the burner nozzle for conducting the cutting gas to the central bore in the said stem, means for adjusting the area of the passages through the pipes leading to the mixing chamber for the purpose of adjusting the quality of the gas mixture for the heating flame, and separate means for cutting off and turning on the gases at will without interfering with the adjustment of the passage area.

11. A cutting torch comprising a burner nozzle, a gas mixing chamber with means for connecting it to the burner nozzle, said nozzle comprising an internally threaded sleeve with a conical end, a stem with a conical end, corresponding with the conical end on the sleeve, said stem fitting in said sleeve, said stem having spiral passages formed thereon, a socket member supporting said stem and on which the sleeve is threaded, said sleeve being adapted to be adjusted on the socket in order to vary the distance between the two conical ends, and means including a gland nut and packing for preventing leakage between the sleeves and the socket, pipes for conducting gases to the mixing chamber to produce a heating gas mixture, another pipe communicating with the burner nozzle for conducting the cutting gas to the said nozzle, means for adjusting the area of the passages through the pipes leading to the mixing chamber for the purpose of adjusting the quality of the gas mixture for the heating flame, and separate means for cutting off and turning on the gases at will without interfering with the adjustment of the passage area.

12. A cutting torch comprising a burner nozzle a gas mixing chamber with means for connecting it to the burner nozzle, said nozzle comprising an internally threaded sleeve with a conical end a stem a conical end, corresponding with the conical end on the sleeve, said stem fitting in said sleeve said stem having spiral passage formed thereon, a socket member supporting said stem on which the sleeve is threaded said sleeve being adapted to be adjusted on the socket in order to vary the distance between the two conical ends, and means including a gland nut and packing for preventing leakage between the sleeve and the socket, pipes for conducting gases to the mixing chamber to produce a heating gas mixture another pipe communicating with the burner nozzle for conducting the cutting gas to the said nozzle, means for adjusting the area of the passages through the pipes leading to the mixing chamber for the purpose of adjusting the quality of the gas mixture for the heating flame, separate means for cutting off and turning on the gases at will without interfering with the adjustment of the passage area, a scale on the sleeve, and a pointer on the cutter head against which the scale is to be read.

13. A cutting torch comprising a burner nozzle a gas mixing chamber with means for connecting it to the burner nozzle, said nozzle comprising an internally threaded sleeve with a conical end a stem with a conical end, corresponding with the conical end on the sleeve, said stem fitting in said sleeve, said stem having spiral passages formed thereon, said stem being in portions, the portion with the conical end having spiral passages of finer pitch than the spiral passages on the remaining portion of the stem, a socket member supporting said stem and on which the sleeve is threaded said sleeve being adapted to be adjusted on the socket in order to vary the distance between the two conical ends, and means including a gland nut and packing for preventing leakage between the sleeve and the socket, pipes for conducting gases to the mixing chamber to produce a heating gas mixture another pipe communicating with the burner nozzle for conducting the cutting gas to the said nozzle, means for adjusting the area of the passages through the pipes leading to the mixing chamber for the purpose of adjusting the quality of the gas mixture for the heating flame, and separate means for cutting off and turning on the gases at will without interfering with the adjustment of the passage area.

14. A cutting torch comprising a burner nozzle a gas mixing chamber with means for connecting it to the burner nozzle, said nozzle comprising an internally threaded sleeve with a conical end a stem with a conical end, corresponding with the conical end on the sleeve, said stem fitting in said sleeve, said stem having spiral passages formed thereon, said stem being in portions, the portion with the conical end having spiral passages of finer pitch than the spiral passages on the remaining portion of the stem, and having a gap before the commencement of said spiral passages of finer pitch, whereby a space is left between the spiral passages of wider pitch and those of finer pitch, a socket member supporting said stem and on which the sleeve is threaded said sleeve being adapted to be adjusted on the socket in order to vary the distance between the two conical ends, and means including a gland nut and packing for preventing leakage between the sleeve and the socket, pipes for conducting gases to the mixing chamber to produce a heating gas mixture another pipe communicating with the burner nozzle for conducting the cutting gas to the said nozzle, means for adjusting the area of the passages through the pipes leading to the mixing chamber for the purpose of adjusting the quality of the gas mixture for the heating flame, and separate means for cutting off and turning on the gases at will without interfering with the adjustment of the passage area.

15. A cutting torch comprising a burner nozzle, said burner nozzle including a sleeve with a conical end, and a centrally bored stem having spiral passages formed around the outer surface thereof, said stem having a conical end corresponding to the conical end of the said sleeve, a gas mixing chamber with means connecting it to the spiral passages around the said stem, a nipple fitting into the central bore of said stem, said nipple projecting beyond the conical end of the sleeve, pipes for conducting gases to the mixing chamber to produce a heating gas mixture, another pipe communicating with the burner nozzle for conducting the cutting gas to the central bore of said stem, means for adjusting the area of the passages through the pipes leading to the mixing chamber for the purpose of adjusting the quality of the gas mixture for the heating flame, and separate means for cutting off and turning on the gases at will without interfering with the adjustment of the passage area.

16. A cutting torch comprising a burner nozzle having a gas mixing chamber, pipes for conveying the gases to said chamber for forming the heating flame mixture another pipe for conveying gas for cutting purposes to said nozzle, said pipe leading into a central bore in said nozzle, valves adjustable by hand for controlling the supply of gases to said mixing chamber, a spring pressed valve held in the closed position by its spring and serving for controlling the admission of the cutting gas to said nozzle, a lever and a catch device therefor, said lever serving for opening the spring pressed cutting gas valve, additional valves for controlling the supply of the heating gases, means for operating said valves simultaneously for admitting and cutting off the supply of said heating gases, and mechanism operated by the means for cutting off the supply of said heating gases, said mechanism being adapted to release the catch device and to allow the lever operating the cutting gas valve to move back and to permit said cutting gas valve to close whenever the valves controlling the supply of heating gases are closed.

ALFRED GODFREY.